United States Patent Office 2,734,917
Patented Feb. 14, 1956

2,734,917
METHOD OF PREPARING ATROLACTAMIDE

August H. Homeyer, Webster Groves, George B. De La Mater, St. Johns, and Lawrence A. Patterson, Ferguson, Mo., assignors to Mallinckrodt Chemical Works, St. Louis, Mo., a corporation of Missouri No Drawing. Application December 18, 1953,
Serial No. 399,164

5 Claims. (Cl. 260—559)

This invention relates to methods for the preparation of atrolactamide and more particularly to methods for the preparation of atrolactamide from acetophenone.

Briefly, the present invention is directed to the method of preparing atrolactamide which comprises combining acetophenone and hydrogen cyanide in the present of a basic catalyst at an equilibrium temperature of less than approximately 0° C. and thereafter adding water and hydrogen chloride, the molar ratio of the water to hydrogen chloride being not greater than approximately 4.5:1.

Among the several objects of this invention are the provision of improved methods for the preparation of atrolactamide from acetophenone; the provision of methods of the class described which are rapid, economical, and efficient in commercial operation; and the provision of methods for the preparation of atrolactamide in high yield containing little atrolactic acid or other impurity. Other objects and features will be in part apparent and in part pointed out hereinafter.

The invention accordingly comprises the methods hereinafter described, the scope of the invention being indicated in the following claims.

In accordance with the present invention, acetophenone is combined with hydrogen cyanide at an equilibrium temperature of less than approximately 0° C. in the presence of a basic catalyst. The equilibrium is then immobilized, and the resulting acetophenone cyanohydrin is hydrolyzed to atrolactamide by addition of water and hydrogen chloride, the molar ratio of the water to hydrogen chloride being not greater than approximately 4.5:1. Following hydrolysis, water is added and the mixture is made just basic to litmus with alkali. The reaction mixture is then steam distilled to remove the remaining acetophenone and hydrogen cyanide. The hot aqueous residue containing the atrolactamide can be filtered and treated with decolorizing carbon, if desired, after which crystals of atrolactamide are formed upon cooling the concentrated aqueous liquor. This process yields between 80–87% crude atrolactamide based on the acetophenone consumed, or approximately 55% based on the acetophenone added initially.

Although an excess of either acetophenone or hydrogen cyanide establishes an equilibrium favoring the production of acetophenone cyanohydrin, the use of an excess of hydrogen cyanide is undesirable in a commercial process because of the toxicity of this material. Limited amounts of water have little effect on the cyanohydrin equilibrium, but larger quantities, such as those present in aqueous hydrocyanic acid solutions, reduce the yield of acetophenone cyanohydrin by lowering the concentration of hydrogen cyanide in the organic phase as well as raising the freezing point of the reaction mixture; therefore, the use of liquid hydrogen cyanide is preferred.

It has also been found that the conversion of acetophenone to its cyanohydrin is much greater at equilibrium temperatures below approximately 0° C. in the presence of a basic catalyst. Although an equilibrium temperature between approximately −20° C. and the freezing point of the reaction mixture is preferred, a favorable yield of the acetophenone cyanohydrin can be obtained in the present of a basic catalyst at any temperature between approximately 0° C. and the freezing point of the mixture. Using equimolar quantities of acetophenone and liquid hydrogen cyanide, 67% conversion of acetophenone to its cyanohydrin is obtained at −20° C. and 71% conversion is obtained at −40° C. Also, at such low temperatures and in the presence of a basic catalyst, equilibrium is reached in a few minutes.

In order to establish the equilibrium favoring the production of acetophenone cyanohydrin in a reasonable length of time at these low temperatures, a basic catalyst is necessary. It has been found that triethylamine, tributylamine and triethanolamine all give excellent yields of acetophenone cyanohydrin in the above process. It will be understood that other customary basic catalysts may also be used effectively.

Upon completion of the above reaction, the equilibrium can be immobilized by neutralization of the basic catalyst with a slight excess of mineral acid so that it can then be warmed without decomposition of the acetophenone cyanohydrin before carrying out the hydrolysis step.

In hydrolyzing acetophenone cyanohydrin to atrolactamide, is has been found that if the molar ratio of water to hydrogen chloride is not greater than approximately 4.5:1, acetophenone cyanohydrin is rapidly hydrolyzed to atrolactamide and only traces of atroloctic acid and 2,5-dimethyl-2,5-diphenyloxazolidone-4 are formed. If the ratio exceeds 4.5:1, a phase separation occurs, hydrolysis proceeds slowly, and considerable quantities of atrolactic acid and 2,5-dimethyl-2,5-diphenyloxazolidone-4 are formed. Although any molar ratio of water to hydrogen chloride less than approximately 4.5:1 is suitable, we prefer a ratio of about 1:0.6. Further, it is preferred that the molar ratio of water to acetophenone should not be less than approximately 1.5:1.

In order to minimize still further the formation of 2,5-dimethyl-2,5-diphenyloxazolidone-4 and other side reaction products, we prefer to carry out the hydrolysis at a temperature between approximately 5° C. and approximately 45° C., because these products are formed at an accelerated rate and somewhat lower yields of atrolactamide are obtained at higher temperatures.

The following examples illustrate the invention:

Example 1

Liquid hydrogen cyanide (255 ml., 6.22 moles) was added to acetophenone (696 ml., 6.0 moles) and triethylamine (18 ml.) over a 15-minute period at a temperature of 20° C. The temperature of the reaction mixture was then gradually lowered to −20° C. over a 30-minute period. Five minutes later, concentrated sulfuric acid (7.5 ml.) was added to immobilize the equilibrium. Concentrated hydrochloric acid (294 ml., 3.51 moles) was added to the reaction mixture over a 3-minute period at a temperature of 15–20° C. Hydrogen chloride (3.52 moles) was then added over a period of 1½ hours (1.4 g. per minute). The temperature of the reaction mixture was maintained at 20–25° C. during this addition. The hydrolysis was allowed to proceed at 20–35° C. for another 2½ hours, at the end of which time the remaining hydrogen cyanide (free and combined) was 5% of the initial quantity. Towards the end of the reaction, the temperature suddenly rose from 30° C. to 34° C. as crystallization of the product began. Water (1 liter) was added rapidly to the cooled mixture. Sodium hydroxide solution (795 ml. of 35° Bé.) was then added over a 25-minute period until the mixture was just basic to litmus.

The reaction mixture was steam distilled until all of the acetophenone had distilled. The acetophenone (234 ml., 2.02 moles) was separated by decantation from the aqueous phase of the distillate. The hot undistilled solution was diluted with hot water (2.5 liters), heated to 92° C., and then weighed. The hot solution (6.15 kg.) was divided into two portions. One portion (4.75 kg.) was purified and the other portion (1.40 kg.) was assayed for yield of atrolactamide.

The latter portion (1.40 kg.) of the hot aqueous solution was cooled with stirring to 10° C. The crystallized amide was collected, washed with cold water (100 ml.) and dried at 65° C. overnight. The dry crude product, weighing 96 g., was found to contain 92 g. of atrolactamide. The filtrate was assayed for atrolactamide and atrolactic acid. The total yield of atrolactamide in the entire 6.15 kg. of reaction mixture was 537 g. (3.25 moles). There were 3.9 g. of atrolactic acid present (0.023 mole). The yield of atrolactamide was 54% based on the acetophenone added initially, 83.5% based on cyanohydrin formed, or 82% based on acetophenone consumed.

The other portion (4.75 kg.) of the hot aqueous solution from the steam distillation was filtered, heated for 20 minutes with decolorizing carbon (22 g.), and filtered. The treatment with decolorizing carbon was repeated and the final filtrate was crystallized by stirring and cooling it to 0° C. The purified amide was collected, washed with cold water (250 ml.), and then dried overnight at 65° C. The yield of purified atrolactamide was 385 g. (2.43 moles) for the entire reaction mixture (a 40% yield of atrolactamide based on the acetophenone added initially, or a 61% yield based on the acetophenone consumed).

*Example 2*

Acetophenone (25.8 lbs., 0.215 lb. mole) and 95% hydrogen cyanide (6.1 lbs., 0.215 lb. mole) were combined in the presence of triethylamine (0.47 lb.) while the temperature was reduced from +20° C. to −20° C. as in Example 1. The equilibrium was immobilized by the addition of concentrated sulfuric acid (0.51 lb.) and the temperature of the mixture was raised to 23° C. The acetophenone cyanohydrin was hydrolyzed at temperatures varying between 23° C. and 38° C. by adding 30% hydrochloric acid (10.6 lbs., 0.087 lb. mole) over a period of 44 minutes and then hydrogen chloride gas (6.43 lbs., 0.176 lb. mole) over a period of 235 minutes. Water (6 gal.) was added and the mixture was made just basic to litmus with 35° Bé. sodium hydroxide (3½ gal.), a temperature less than 34° C. being maintained. Unreacted acetophenone was recovered by steam distillation. The hot aqueous residue was stirred with decolorizing carbon (0.75 lb.) for 20–30 minutes at a temperature of 95–100° C., and filtered. The filter cake was washed with the hot water (3 gal.) and the combined filtrates were stirred overnight at 20–25° C. The crystalline products was filtered off and washed with water (1–2 gal.). The wet product contained 17.45 lbs. of atrolactamide, which corresponds to a yield of 49% based on the acetophenone added initially, or 72% based on the acetophenone consumed.

*Example 3*

The procedure of Example 1 was followed, employing acetophenone (2 moles) and hydrogen cyanide (2 moles) in the presence of triethanolamine at a temperature of −20° C. The acetophenone cyanohydrin was hydrolyzed at temperatures varying between 7° C. and 10° C. over a period of 3½ hours using hydrogen chloride (2.66 moles) and water (4 moles). The yield of atrolactamide was 41% based on the acetophenone added initially, or 79.5% based on the acetophenone consumed.

*Example 4*

The procedure of Example 1 was followed, employing acetophenone (6 moles) and hydrogen cyanide (6 moles) in the presence of triethylamine at a temperature of −20° C. The acetophenone cyanohydrin was hydrolyzed at temperatures varying between 20° C. and 23° C. over a period of 267 minutes using hydrogen chloride (6.05 moles) and water (12 moles). The yield of atrolactamide was 47% based on the acetophenone added initially, or 82% based on the acetophenone consumed.

*Example 5*

The procedure of Example 1 was followed, employing acetophenone (1 mole) and hydrogen cyanide (1 mole) in the presence of triethylamine at a temperature of −20° C. The acetophenone cyanohydrin was hydrolyzed at temperatures varying between 20° C. and 25° C. over a period of 2 hours using hydrogen chloride (2.2 moles) and water (4.15 moles). The yield of atrolactamide was 60% based on the acetophenone added initially, or 91.6% based on the acetophenone consumed.

*Example 6*

The procedure of Example 1 was followed, employing acetophenone (1 mole) and hydrogen cyanide (1 mole) in the presence of triethylamine at a temperature of −20° C. The acetophenone cyanohydrin was hydrolyzed at temperatures varying between 20° C. and 25° C. over a period of 6.5 hours using hydrogen chloride (1.21 moles) and water (4.15 moles). The yield of atrolactamide was 29.2% based on the acetophenone added initially, or 78% based on the acetophenone consumed.

*Example 7*

The procedure of Example 1 was followed, employing acetophenone (1 mole) and hydrogen cyanide (1 mole) in the presence of triethylamine at a temperature of −20° C. The acetophenone cyanohydrin was hydrolyzed at temperatures varying between 20° C. and 25° C. over a period of 5 hours using hydrogen chloride (4.93 moles) and water (18.6 moles). The yield of atrolactamide was 52% based on the acetophenone added initially, or 87% based on the acetophenone consumed.

*Example 8*

The procedure of Example 1 was followed, employing acetophenone (2 moles) and hydrogen cyanide (2 moles) in the presence of tributylamine at a temperature of −20° C. The acetophenone cyanohydrin was hydrolyzed at temperatures varying between 31° C. and 33° C. over a period of 190 minutes using hydrogen chloride (2.41 moles) and water (4 moles). The yield of atrolactamide was 56% based on the acetophenone added initially, or 80.5% based on the acetophenone consumed.

*Example 9*

The procedure of Example 1 was followed, employing acetophenone (2.2 moles) and hydrogen cyanide (0.98 mole) in the presence of tributylamine at a temperature of 2° C. The acetophenone cyanohydrin was hydrolyzed at temperatures varying between 10° C. and 26° C. over a period of 19 hours using hydrogen chloride (1.2 moles) and water (2.0 moles). The yield of atrolactamide was 31% based on the acetophenone added initially, or 74% based on the acetophenone consumed.

*Example 10*

The procedure of Example 1 was followed, employing acetophenone (2 moles) and hydrogen cyanide (2 moles) in the presence of triethanolamine at a temperature of −20° C. The acetophenone cyanohydrin was hydrolyzed at temperatures varying between 39° C. and 43° C. over a period of 3 hours using hydrogen chloride (2.4 moles) and water (4.3 moles). The yield of atrolactamide was 40% based on the acetophenone added initially, or 79% based on the acetophenone consumed.

In view of the above, it will be seen that the several objects of the invention are achieved and other advantageous results obtained.

As various changes could be made in the above methods without departing from the scope of the invention, it is intended that all matter contained in the above description shall be interpreted as illustrative and not in a limiting sense.

We claim:

1. In the method of preparing atrolactamide by reacting acetophenone and hydrogen cyanide and hydrolyzing the resulting cyanohydrin with hydrochloric acid, the improvement which comprises cooling the mixture of hydrogen cyanide and acetophenone in the presence of a basic catalyst to a temperature of less than approximately 0° C., and neutralizing the basic catalyst at that temperature by adding a mineral acid.

2. In the method of preparing atrolactamide by reacting acetophenone and hydrogen cyanide and hydrolyzing the resulting cyanohydrin with hydrochloric acid, the improvement which comprises cooling an approximately equimolecular mixture of hydrogen cyanide and acetophenone in the presence of a basic catalyst to a temperature of approximately —20° C., and neutralizing the basic catalyst at that temperature by adding a mineral acid.

3. In the method of preparing atrolactamide by reacting acetophenone and hydrogen cyanide and hydrolyzing the resulting cyanohydrin with hydrochloric acid, the improvements which comprise cooling the mixture of hydrogen cyanide and acetophenone in the presence of a basic catalyst to a temperature of less than approximately 0° C., neutralizing the basic catalyst at that temperature by adding a mineral acid, and thereafter gradually adding hydrogen chloride to the cyanohydrin-hydrochloric acid mixture.

4. In the method of preparing atrolactamide by reacting acetophenone and hydrogen cyanide and hydrolyzing the resulting cyanohydrin with hydrochloric acid, the improvements which comprise cooling the mixture of hydrogen cyanide and acetophenone in the presence of a basic catalyst to a temperature of less than approximately 0° C., neutralizing the basic catalyst at that temperature by adding a mineral acid, and thereafter gradually adding hydrogen chloride over a period of at least approximately one and one-half hours to the cyanohydrin-hydrochloric acid mixture, the molar ratio of water to hydrogen chloride being no greater than approximately 4.5:1.

5. In the method of preparing atrolactamide by reacting acetophenone and hydrogen cyanide and hydrolyzing the resulting cyanohydrin with hydrochloric acid, the improvements which comprise cooling an approximately equimolecular mixture of hydrogen cyanide and acetophenone in the presence of a basic catalyst selected from the group consisting of triethylamine, tributylamine and triethanolamine to a temperature of approximately —20° C., neutralizing the basic catalyst at that temperature by adding a mineral acid, and thereafter gradually adding hydrogen chloride over a period of approximately one and one-half to approximately six hours to the cyanohydrin-hydrochloric acid mixture while maintaining the reaction mixture at a temperature of between approximately 5° C. and approximately 45° C., the molar ratio of water to hydrogen chloride being approximately 1:0.6 and the molar ratio of water to acetophenone being approximately 2:1.

References Cited in the file of this patent

UNITED STATES PATENTS 2,362,049    Clifford et al. _____ Nov. 7, 1944

OTHER REFERENCES

Migrdichian: "The Chem. of Org. Cyanogen Compounds," (1947), p. 173.

Staudinger et al.: "Liebigs Annalen," vol. 380 (1911), pp. 289–91.

McKenzie et al.: "J. Chem. Soc." (London), vol. 115 (1919), p. 833.